United States Patent
Kaneoka et al.

(10) Patent No.: US 9,989,786 B2
(45) Date of Patent: Jun. 5, 2018

(54) OPTICAL TRANSMISSION DEVICE, OPTICAL MODULATOR, AND BIAS CONTROL METHOD

(71) Applicant: FUJITSU LIMITED, Kawasaki-shi, Kanagawa (JP)

(72) Inventors: Tomohiro Kaneoka, Kawasaki (JP); Hiroshi Ogiwara, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/477,763

(22) Filed: Apr. 3, 2017

(65) Prior Publication Data
US 2017/0293165 A1  Oct. 12, 2017

(30) Foreign Application Priority Data
Apr. 7, 2016 (JP) ................. 2016-077557

(51) Int. Cl.
*H04B 10/50*  (2013.01)
*G02F 1/01*  (2006.01)
(Continued)

(52) U.S. Cl.
CPC ..... *G02F 1/0123* (2013.01); *H04B 10/50572* (2013.01); *H04B 10/50575* (2013.01);
(Continued)

(58) Field of Classification Search
CPC ............. G02F 1/0123; G02F 2001/212; H04B 10/5561; H04B 10/50572; H04B 10/548;
(Continued)

(56) References Cited

U.S. PATENT DOCUMENTS 7,308,210 B2 * 12/2007 Khayim ............... H04B 10/505
398/198
9,762,331 B2 * 9/2017 Toya ................. H04B 10/5057
(Continued)

FOREIGN PATENT DOCUMENTS

EP    1975693 A1    10/2008
EP    2280498 A1    2/2011
(Continued)

OTHER PUBLICATIONS

EESR—The Extended European Search Report of European Patent Application No. 17164957.7 dated Aug. 29, 2017.

*Primary Examiner* — Danny Leung
(74) *Attorney, Agent, or Firm* — Fujitsu Patent Center (57) ABSTRACT

An optical transmission device includes an optical modulator and a processor. The optical modulator optically modulates an optical signal with a driving signal to output a modulated optical signal. The processor performs ABC on a bias of the optical modulator, using the modulated optical signal, so as to cause the bias to converge to an optimum point. The processor starts the ABC using a modulated optical signal optically modulated with a QPSK signal at start-up timing, acquires an optimum value that is a bias value when the bias converges to the optimum point, and stops the ABC. After the ABC is stopped, the processor sets the acquired optimum value as an initial value, and restarts the ABC using a modulated optical signal optically modulated with an N-QPSK signal.

6 Claims, 9 Drawing Sheets

(51) Int. Cl.
   *H04B 10/54* (2013.01)
   *H04B 10/548* (2013.01)
   *H04B 10/556* (2013.01)
   *G02F 1/21* (2006.01)

(52) U.S. Cl.
   CPC ..... *H04B 10/50595* (2013.01); *H04B 10/541* (2013.01); *H04B 10/548* (2013.01); *H04B 10/5561* (2013.01); *G02F 2001/212* (2013.01)

(58) Field of Classification Search
   CPC ........ H04B 10/50595; H04B 10/50575; H04B 10/541
   See application file for complete search history.

(56) References Cited

U.S. PATENT DOCUMENTS

| | | | | |
|---|---|---|---|---|
| 2005/0105917 | A1* | 5/2005 | Narusawa | H04B 10/50575 398/183 |
| 2008/0080872 | A1* | 4/2008 | Tanaka | H04B 10/505 398/186 |
| 2012/0155880 | A1* | 6/2012 | Nishimoto | H04B 10/50572 398/79 |
| 2013/0148981 | A1* | 6/2013 | Yasuda | H04B 10/50575 398/185 |
| 2013/0156444 | A1* | 6/2013 | Akashi | G02F 1/0123 398/186 |
| 2014/0029956 | A1* | 1/2014 | Le Taillandier De Gabory | G02F 1/0123 398/186 |
| 2014/0308047 | A1* | 10/2014 | Mak | H04B 10/5055 398/182 |
| 2016/0056896 | A1* | 2/2016 | Toya | H04B 10/5053 398/183 |
| 2016/0156416 | A1* | 6/2016 | Shirakawa | H04B 10/0799 398/136 |
| 2017/0293165 | A1* | 10/2017 | Kaneoka | G02F 1/0123 |

FOREIGN PATENT DOCUMENTS

| | | |
|---|---|---|
| JP | 2008-092172 | 4/2008 |
| JP | 2011-232553 | 11/2011 |
| JP | 2012-217127 | 11/2012 |
| JP | 2013-126050 | 6/2013 |
| JP | 2013-127519 | 6/2013 |
| JP | 2014-22871 | 2/2014 |
| JP | 2014-516480 | 7/2014 |
| WO | 2012144082 | 10/2012 |

* cited by examiner

OPTICAL TRANSMISSION DEVICE, OPTICAL MODULATOR, AND BIAS CONTROL METHOD

CROSS-REFERENCE TO RELATED APPLICATION

This application is based upon and claims the benefit of priority of the prior Japanese Patent Application No. 2016-077557, filed on Apr. 7, 2016, the entire contents of which are incorporated herein by reference.

FIELD

The embodiments discussed herein are related to an optical transmission device, an optical modulator, and a bias control method.

BACKGROUND

Recently, in optical transmission devices, improvement in frequency use efficiency has been desired with increasing traffic demand. In view of this, in such an optical transmission device, a driving signal is electrically filtered to narrow the bandwidth of a modulated optical signal, whereby the frequency use efficiency can be improved.

In the optical transmission device, as an optical modulator of a quadrature phase shift keying (QPSK) modulation scheme mainly used in, for example, a 100-GHz coherent optical communication system, for example, a Mach-Zehnder modulator (MZM) is used. Furthermore, the MZM has an I (In-phase channel)-arm and a Q (Quadrature-phase channel)-arm and, in order to cause biases of the I-arm and the Q-arm by using a modulated optical signal at an output stage to converge to optimum points, uses automatic bias control (ABC) of controlling the respective bias values. Conventional examples are described in Japanese National Publication of International Patent Application No. 2014-516480, Japanese Laid-open Patent Publication No. 2012-217127, Japanese Laid-open Patent Publication No. 2013-127519, Japanese Laid-open Patent Publication No. 2013-126050, and Japanese Laid-open Patent Publication No. 2008-092172.

However, electrically filtering the driving signal causes the driving signal to become smaller, which increases the number of convergence points used as indices when the ABC is performed, thereby causing false convergence. Besides, although there are a plurality of convergence points, there is only one correct convergence point.

Furthermore, in the optical modulator, when the average driving amplitude of the driving signal is small, the monitor sensitivity decreases, which needs more time until the biases are optimized, thereby increasing processing load therefor. In other words, until the biases are optimized, a significantly long period of time is needed to perform the ABC again and change initial biases for restart.

SUMMARY

According to an aspect of an embodiment, an optical transmission device includes a light emitter, a generator, an optical modulator and a processor. The light emitter emits an optical signal. The generator generates a driving signal. The optical modulator optically modulates the optical signal with the driving signal to output a modulated optical signal. The processor controls a bias of the optical modulator, using the modulated optical signal, so as to cause the bias to converge to an optimum point. The processor controls the generator so as to output the driving signal having an amplitude equal to or larger than a predetermined amplitude value at start-up timing. The processor starts control of the bias using the modulated optical signal optically modulated with the driving signal having the amplitude equal to or larger than the predetermined amplitude value. The processor acquires an optimum value that is a bias value when the bias converges to the optimum point. The processor stops the control of the bias. The processor controls the generator so as to output the driving signal having an amplitude smaller than the predetermined amplitude value after stopping the control of the bias. The processor sets the acquired optimum value as an initial value. The processor restarts the control of the bias using the modulated optical signal optically modulated with the driving signal having the amplitude smaller than the predetermined amplitude value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. These embodiments do not limit the technique disclosed herein. The respective embodiments may be appropriately used in combination.

[a] First Embodiment

Figure 1:
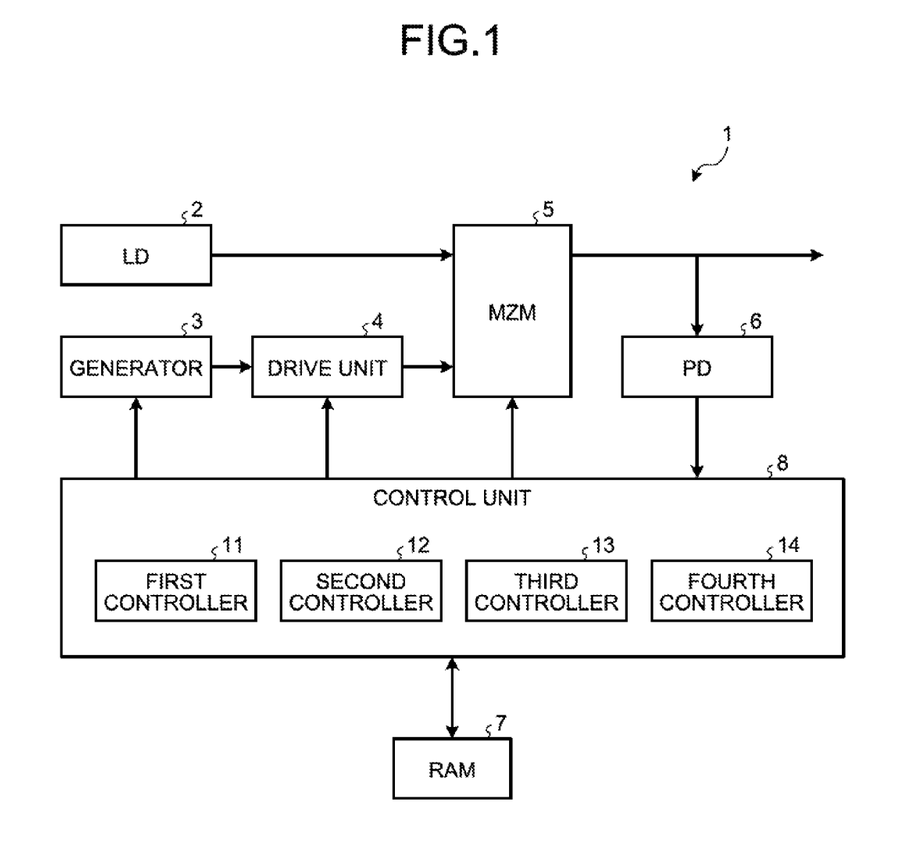
FIG. 1 is an explanatory diagram illustrating one example of an optical transmission device according to a first embodiment.

FIG. 1 is an explanatory diagram illustrating one example of an optical transmission device 1 according to a first embodiment. The optical transmission device 1 illustrated in FIG. 1 includes a laser diode (LD) 2, a generator 3, a drive unit 4, an MZM 5, a photo diode (PD) 6, a random access memory (RAM) 7, and a control unit 8. The LD2 is a light emitter that emits an optical signal having a desired optical wavelength. The generator 3 is, for example, a radio frequency (RF) oscillator that generates a driving signal such as an RF signal. The driving signal is a driving signal such as a quadrature phase shift keying (QPSK) signal or a Nyquist-quadrature phase shift keying (N-QPSK) signal.

The drive unit 4 is a driver circuit that amplifies the driving signal from the generator 3. The MZM 5 is an optical modulation unit that optically modulates an optical signal with the driving signal to output a modulated optical signal. The MZM 5, having an I-arm and a Q-arm (not illustrated), optically modulates an optical signal input to the I-arm with the driving signal to generate a modulated optical signal on the I-arm side, and optically modulates an optical signal input to the Q-arm with the driving signal to generate a modulated optical signal on the Q-arm side. Furthermore, the MZM 5 combines the modulated optical signal on the I-arm side with the modulated optical signal on the Q-arm side to output a modulated optical signal.

The PD6 is a light receiver that is disposed at an output stage of the MZM 5 to receive the modulated optical signal output by the MZM 5. The RAM 7 is a storage that stores therein various types of information. The control unit 8 controls the entire optical transmission device 1. The control unit 8 performs ABC. In order to cause biases of the MZM 5 to converge to optimum points by using the modulated optical signal received by the PD6, the control unit 8 controls the respective bias values of the I-arm and the Q-arm, for example.

The control unit 8 includes a first controller 11, a second controller 12, a third controller 13, and a fourth controller 14. The first controller 11 controls the generator 3 so as to output a driving signal having an amplitude equal to or larger than a predetermined amplitude value at start-up timing of the optical transmission device 1. The start-up timing is, for example, a timing when a new modulated optical signal is added in the optical transmission device 1. The driving signal having an amplitude equal to or larger than a predetermined amplitude value is, for example, a driving signal having a driving amplitude value of $2v\pi$, such as a QPSK signal. The predetermined amplitude value is a driving amplitude value equal to or larger than 60% of $2v\pi$, for example.

The second controller 12 starts ABC using a modulated optical signal optically modulated with a QPSK signal, acquires a bias value when each bias converges to an optimum point in the ABC, which is an optimum value, and then stops the ABC. The second controller 12 stores the acquired optimum value in the RAM 7. After the ABC using the modulated optical signal optically modulated with the QPSK signal is stopped, the third controller 13 controls the generator 3 so as to output a driving signal having an amplitude smaller than the predetermined amplitude value. The driving signal having an amplitude smaller than the predetermined amplitude value is an N-QPSK signal, for example.

The fourth controller 14 sets, as an initial value for ABC, an optimum value stored in the RAM 7 that is an optimum value obtained in the ABC using the modulated optical signal optically modulated with the QPSK signal, and restarts the ABC with the modulated optical signal optically modulated with the N-QPSK signal. Consequently, the optical transmission device 1 restarts the ABC using the modulated optical signal optically modulated with the N-QPSK signal, and thus can optimize the bias value of the MZM 5 when outputting the modulated optical signal optically modulated with the N-QPSK signal.

Figure 2:
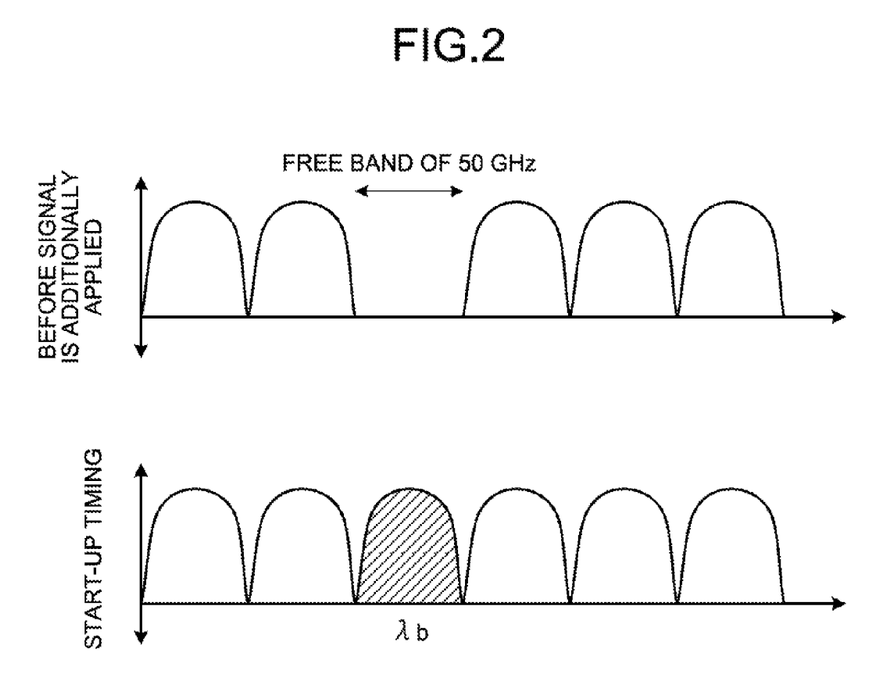
FIG. 2 is an explanatory diagram illustrating one example of processing when a modulated optical signal of the optical transmission device according to the first embodiment is used to perform ABC in a free band.

The following describes operation of the optical transmission device 1 according to the first embodiment. FIG. 2 is an explanatory diagram illustrating one example of processing when a modulated optical signal of the optical transmission device 1 according to the first embodiment is used to perform the ABC in a free band. It is assumed that, in the operation band of a network illustrated in FIG. 2, for example, a modulated optical signal is arranged at frequency intervals of 50 GHz, and a free band the bandwidth of which is 50 GHz exists. It is also assumed that the optical transmission device 1 additionally arranges a modulated optical signal optically modulated with an N-QPSK signal into the free band of 50 GHz. Herein, while the modulated optical signal optically modulated with a QPSK signal of 32 Gbaud is arranged at frequency intervals of 50 GHz, the modulated optical signal optically modulated with the N-QPSK signal is arranged at frequency intervals of 37.5 GHz, for example. In this case, the control unit 8 uses the modulated optical signal optically modulated with the QPSK signal to start the ABC in the free band at the start-up timing. When the width of the free band is 50 GHz, the ABC can be performed in the free band by using the modulated optical signal optically modulated with the QPSK signal, whereby crosstalk between adjacent signals due to the modulated optical signal can be prevented.

Figure 3:
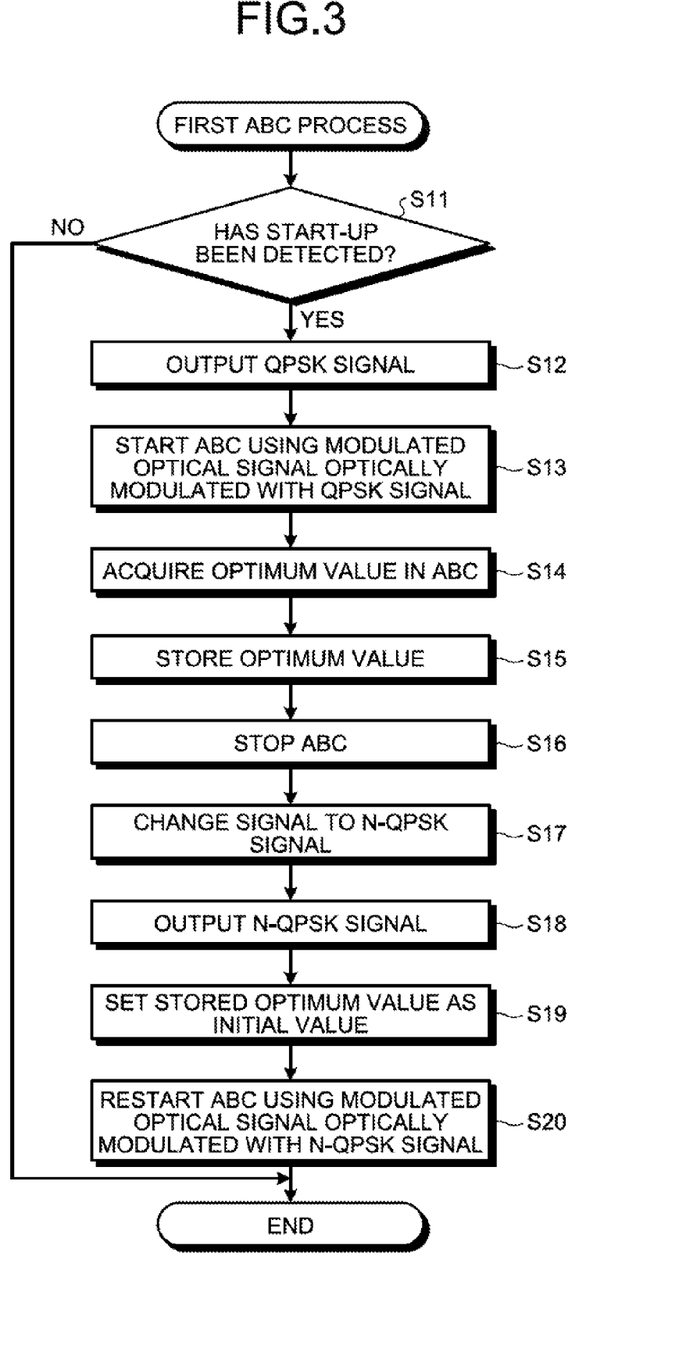
FIG. 3 is a flowchart illustrating one example of processing operation of a control unit in the optical transmission device related to a first ABC process.

FIG. 3 is a flowchart illustrating one example of processing operation of the control unit 8 in the optical transmission device 1 related to a first ABC process. The first ABC process includes processes of acquiring an optimum value in the ABC using the modulated optical signal optically modulated with the QPSK signal at the start-up timing, setting the optimum value as the initial value, and restarting the ABC using the modulated optical signal optically modulated with the N-QPSK signal.

In FIG. 3, the first controller 11 in the control unit 8 determines whether the start-up timing of the optical transmission device 1 has been detected (step S11). If the start-up timing has been detected (Yes at step S11), the first controller 11 controls the generator 3 so as to output the QPSK signal (step S12). Consequently, the MZM 5 outputs a modulated optical signal obtained by optically modulating an optical signal with the QPSK signal.

The second controller 12 in the control unit 8 starts the ABC using the modulated optical signal optically modulated with the QPSK signal detected by the PD6 (step S13). After starting the ABC using the modulated optical signal optically modulated with the QPSK signal, the second controller 12 acquires an optimum value in the ABC (step S14). When having acquired an optimum value in the ABC, the second controller 12 stores the acquired optimum value in the RAM 7 (step S15), and stops the ABC (step S16).

After the ABC is stopped, the third controller 13 in the control unit 8 controls the generator 3 so as to change the QPSK signal to the N-QPSK signal (step S17). The third controller 13 controls the generator 3 so as to output the N-QPSK signal (step S18). The third controller 13 sets the optimum value stored in the RAM 7 as an initial value for the ABC (step S19), restarts the ABC using the modulated optical signal optically modulated with the N-QPSK signal (step S20), and ends the processing operation illustrated in FIG. 3. Consequently, the optimum value obtained by using the modulated optical signal optically modulated with the QPSK signal is set as the initial value, and thus the processing time needed to optimize the bias of the MZM 5 when the modulated optical signal optically modulated with the N-QPSK signal is output can be reduced.

The control unit 8 that performs the first ABC process starts the ABC using the modulated optical signal optically modulated with the QPSK signal at the start-up timing, acquires the optimum value obtained in the ABC, and then stops the ABC. Furthermore, the control unit 8 sets the acquired optimum value as the initial value for the ABC, and restarts the ABC using the modulated optical signal optically modulated with the N-QPSK signal. Consequently, the optimum value obtained in the ABC using the modulated optical signal of the QPSK signal is used when the ABC using the modulated optical signal optically modulated with the N-QPSK signal is performed, and thus the processing load needed to optimize the bias of the MZM 5 when the modulated optical signal optically modulated with the N-QPSK signal is output can be reduced.

The optical transmission device 1 according to the first embodiment sets, as the initial value, the optimum value obtained in the ABC using the modulated optical signal optically modulated with the QPSK signal, and restarts the ABC using the modulated optical signal optically modulated with the N-QPSK signal. Consequently, the processing load needed to optimize the bias of the MZM 5 when the modulated optical signal optically modulated with the N-QPSK signal is output can be reduced. The processing time needed to optimize the bias of the MZM 5 when the modulated optical signal is optically modulated with the N-QPSK signal can be reduced. Furthermore, by causing each bias of the MZM 5 to converge to an optimum point, false convergence can be prevented. Thus, because the number of convergence points when the QPSK signal is used is one, the bias can be caused to converge to the optimum point reliably in a short time.

In the first embodiment described above, the ABC using the modulated optical signal of the QPSK signal is performed in the free band the bandwidth of which is 50 GHz at the start-up timing. However, a QPSK signal having a reduced baud rate may be used, instead. An embodiment in this case will be described hereinafter as a second embodiment.

[b] Second Embodiment

Figure 4:
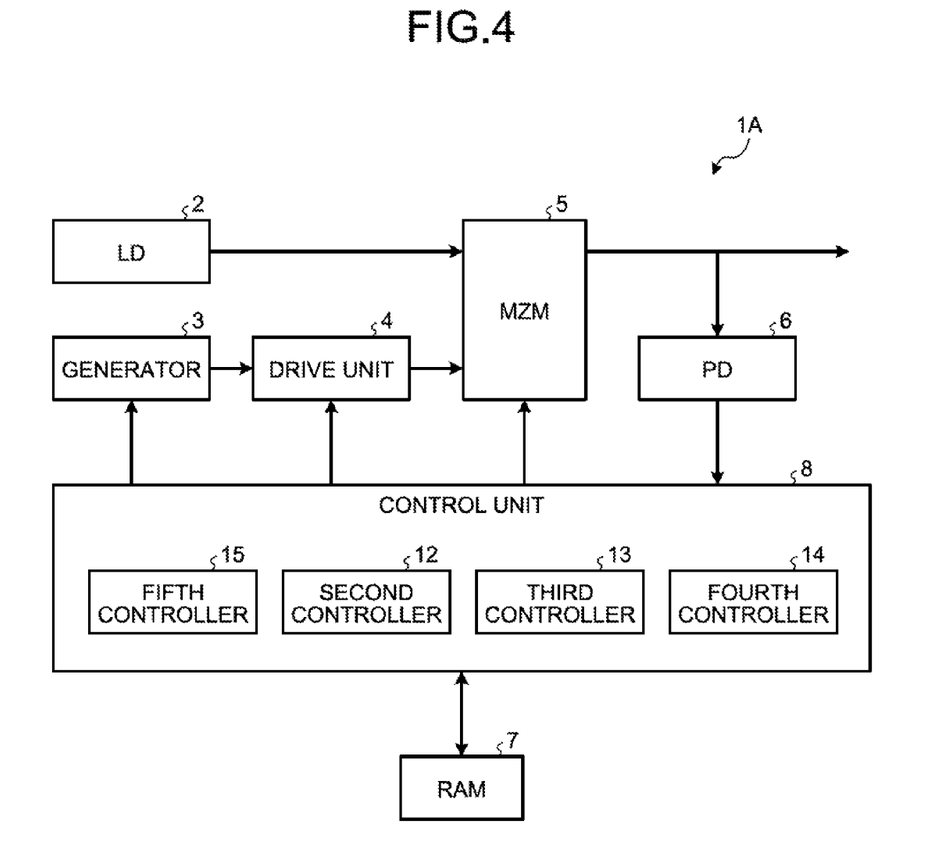
FIG. 4 is an explanatory diagram illustrating one example of an optical transmission device according to a second embodiment.

FIG. 4 is an explanatory diagram illustrating one example of an optical transmission device 1A according to the second embodiment. Herein, components that are the same as those of the optical transmission device 1 illustrated in FIG. 1 are designated by the same numerals, and duplicate description of these components and operation thereof is omitted. The optical transmission device 1A illustrated in FIG. 4 is different from the optical transmission device 1 illustrated in FIG. 1 in that a fifth controller 15 is provided instead of the first controller 11. The fifth controller 15 determines whether the bandwidth of the modulated optical signal optically modulated with the QPSK signal at the start-up timing exceeds the width of the free band. If the bandwidth of the modulated optical signal optically modulated with the QPSK signal exceeds the width of the free band, the fifth controller 15 controls the generator 3 so as to reduce the baud rate of the QPSK signal to output a QPSK signal having a baud rate thus adjusted. The processing of reducing the baud rate of the QPSK signal is processing of reducing the baud rate from 32 Gbaud to 16 Gbaud, for example.

The second controller 12 starts the ABC using a modulated optical signal of a QPSK signal having a baud rate of 16 Gbaud, acquires an optimum value obtained in this ABC, and stores the acquired optimum value in the RAM 7. The second controller 12 stops the ABC using the modulated optical signal optically modulated with the QPSK signal having a baud rate of 16 Gbaud.

After the ABC using the modulated optical signal optically modulated with the QPSK signal having a baud rate of 16 Gbaud is stopped, the third controller 13 controls the generator 3 so as to output the N-QPSK signal. The fourth controller 14 sets the optimum value stored in the RAM 7 as an initial value for the ABC, and restarts the ABC using the modulated optical signal optically modulated with the N-QPSK signal. Consequently, the optical transmission device 1A restarts the ABC using the modulated optical signal optically modulated with the N-QPSK signal, and thus can optimize the bias of the MZM 5 when outputting the modulated optical signal of the N-QPSK signal.

Figure 5:
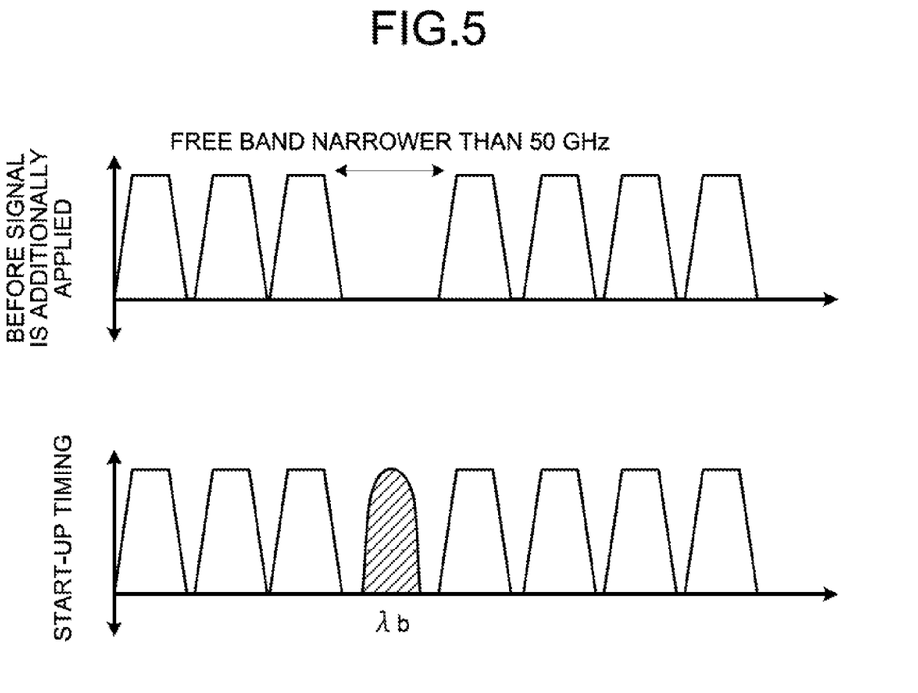
FIG. 5 is an explanatory diagram illustrating one example of processing when a modulated optical signal of the optical transmission device according to the second embodiment is used to perform ABC in a free band.

The following describes operation of the optical transmission device 1A according to the second embodiment. FIG. 5 is an explanatory diagram of one example processing when a modulated optical signal of the optical transmission device 1A according to the second embodiment is used to perform the ABC in a free band. It is assumed that, in the operation band of a network illustrated in FIG. 5, a modulated optical signal is arranged at frequency intervals shorter than 50 GHz, for example, and a free band the bandwidth of which is narrower than 50 GHz exists. It is also assumed that the optical transmission device 1A additionally arranges a modulated optical signal optically modulated with the N-QPSK signal into the free band narrower than 50 GHz. In this case, because the bandwidth of the modulated optical signal optically modulated with the QPSK signal exceeds the width of the free band, the control unit 8 reduces the baud rate of the QPSK signal, and uses the modulated optical signal optically modulated with the QPSK signal having a baud rate thus adjusted to start the ABC in the free band at the start-up timing. Consequently, even when the width of the free band is narrower than 50 GHz, the ABC using the modulated optical signal optically modulated with the QPSK signal having the adjusted baud rate can be performed, whereby crosstalk between adjacent signals due to the modulated optical signal can be prevented.

Figure 6:
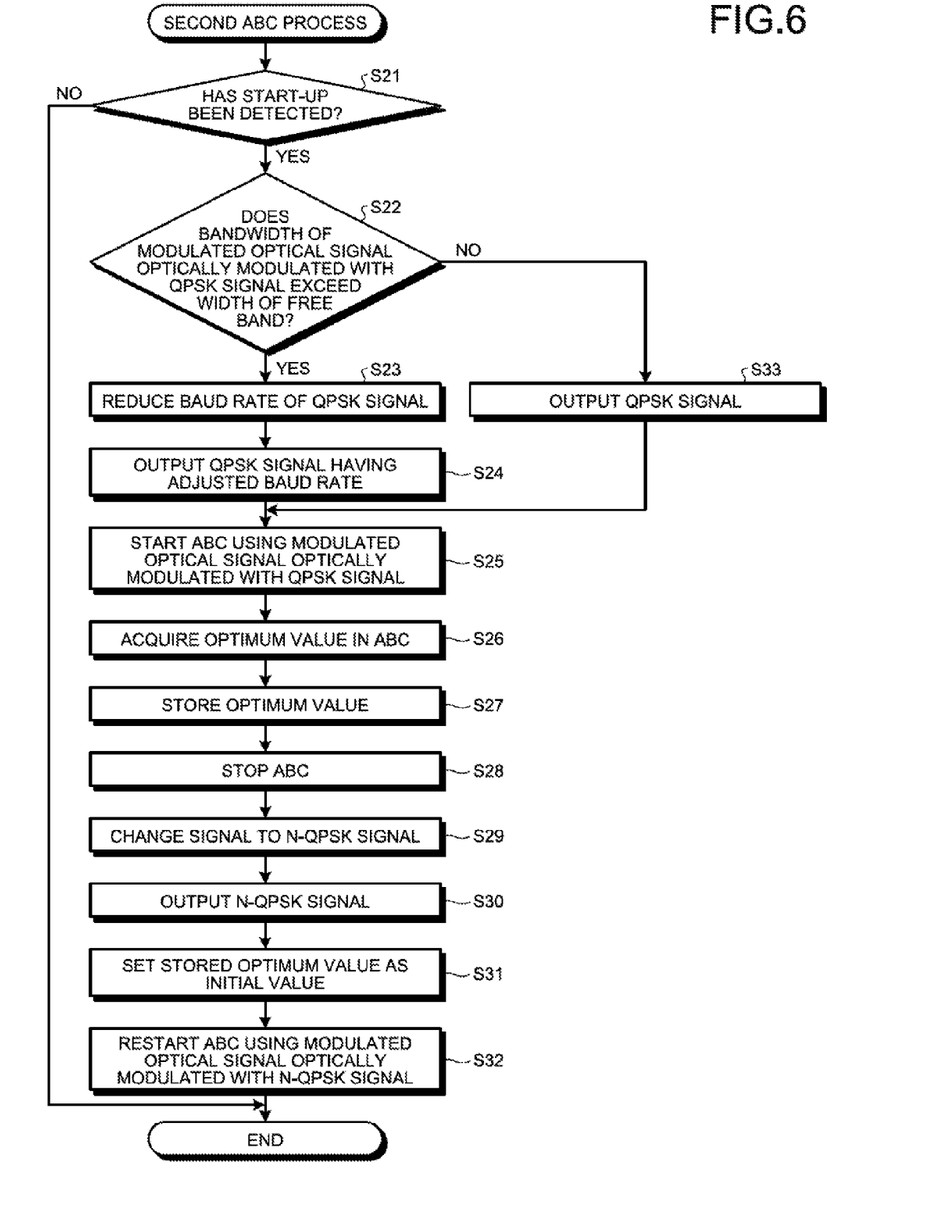
FIG. 6 is a flowchart illustrating one example of processing operation of the control unit in the optical transmission device related to a second ABC process.

FIG. 6 is a flowchart illustrating one example of processing operation of the control unit 8 in the optical transmission device 1A related to a second ABC process. In FIG. 6, the fifth controller 15 in the optical transmission device 1A determines whether the start-up timing has been detected (step S21). If the start-up timing has been detected (Yes at step S21), the fifth controller 15 determines whether the bandwidth of the modulated optical signal optically modulated with the QPSK signal exceeds the width of the free band (step S22).

If the bandwidth of the modulated optical signal optically modulated with the QPSK signal exceeds the width of the free band (Yes at step S22), the fifth controller 15 controls the generator 3 so as to reduce the baud rate of the QPSK signal (step S23). The fifth controller 15 reduces the baud rate of the QPSK signal from 32 Gbaud to 16 Gbaud. The fifth controller 15 controls the generator 3 so as to output the QPSK signal having a baud rate thus adjusted (step S24).

The second controller 12 starts the ABC using the modulated optical signal optically modulated with the QPSK signal having the adjusted baud rate (step S25). In other words, the ABC using the modulated optical signal can be performed in the free band narrower than 50 GHz. The second controller 12 acquires an optimum value in the ABC (step S26). When having acquired an optimum value in the ABC, the second controller 12 stores the optimum value in the RAM 7 (step S27). After storing the optimum value in the RAM 7, the second controller 12 stops the ABC using the modulated optical signal optically modulated with the QPSK signal having the adjusted baud rate (step S28).

After the ABC is stopped, the third controller 13 controls the generator 3 so as to change the QPSK signal to the N-QPSK signal (step S29). Herein, the baud rate of the N-QPSK signal is 32 Gbaud. The third controller 13 controls the generator 3 so as to output the N-QPSK signal (step S30). The third controller 13 sets the optimum value stored in the RAM 7 as the initial value for the ABC (step S31), restarts the ABC using the modulated optical signal optically modulated with the N-QPSK signal (step S32), and ends the processing operation illustrated in FIG. 6. Consequently, the optimum value obtained by using the modulated optical signal optically modulated with the QPSK signal is set as the initial value, and thus the processing time needed to optimize the bias of the MZM 5 when the modulated optical signal optically modulated with the N-QPSK signal is output can be reduced.

If the bandwidth of the modulated optical signal optically modulated with the QPSK signal does not exceed the width of the free band (No at step S22), the fifth controller 15 controls the generator 3 so as to output a QPSK signal having a baud rate of 32 Gbaud (step S33), and the processing operation proceeds to step S25.

When the bandwidth of the modulated optical signal optically modulated with the QPSK signal exceeds the width of the free band at the start-up timing, the control unit 8 that performs the second ABC process reduces the baud rate of the QPSK signal, and starts the ABC using the modulated optical signal optically modulated with the QPSK signal having this adjusted baud rate. Furthermore, the control unit 8 acquires the optimum value obtained in the ABC, and stops the ABC. Furthermore, the control unit 8 sets the optimum value as the initial value for the ABC, and restarts the ABC using the modulated optical signal optically modulated with the N-QPSK signal. Consequently, even when the bandwidth of the modulated optical signal optically modulated with the QPSK signal exceeds the width of the free band, the ABC using the modulated optical signal optically modulated with the QPSK signal can be performed by reducing the baud rate of the QPSK signal. Because the optimum value obtained in the ABC using the modulated optical signal optically modulated with the QPSK signal is used, the processing load needed to optimize the bias of the MZM 5 when the modulated optical signal optically modulated with the N-QPSK signal is output can be reduced. Because the ABC using the modulated optical signal optically modulated with the QPSK signal having the reduced baud rate at the start-up timing, even when the wavelength interval is narrow, crosstalk between adjacent signals can be prevented.

In the foregoing, if the bandwidth of the modulated optical signal optically modulated with the QPSK signal exceeds the width of the free band at the start-up timing, the fifth controller 15 reduces the baud rate of the QPSK signal from 32 Gbaud to 16 Gbaud. However, the baud rate herein is not limited to 16 Gbaud, and may be reduced from 32 Gbaud to 8 Gbaud.

In the foregoing, if the bandwidth of the modulated optical signal optically modulated with the QPSK signal exceeds the width of the free band at the start-up timing, the fifth controller 15 reduces the baud rate of the QPSK signal. However, the fifth controller 15 may reduce the baud rate of the QPSK signal regardless of whether the bandwidth of the modulated optical signal optically modulated with the QPSK signal exceeds the width of the free band at the start-up timing.

In the first embodiment described above, the ABC using the modulated optical signal of the QPSK signal is performed at the start-up timing in the free band the bandwidth of which is 50 GHz. After a free band in the operation band is searched, the ABC using the modulated optical signal optically modulated with the QPSK signal may be performed in the free band. An embodiment in this case will be described hereinafter as a third embodiment.

[c] Third Embodiment

Figure 7:
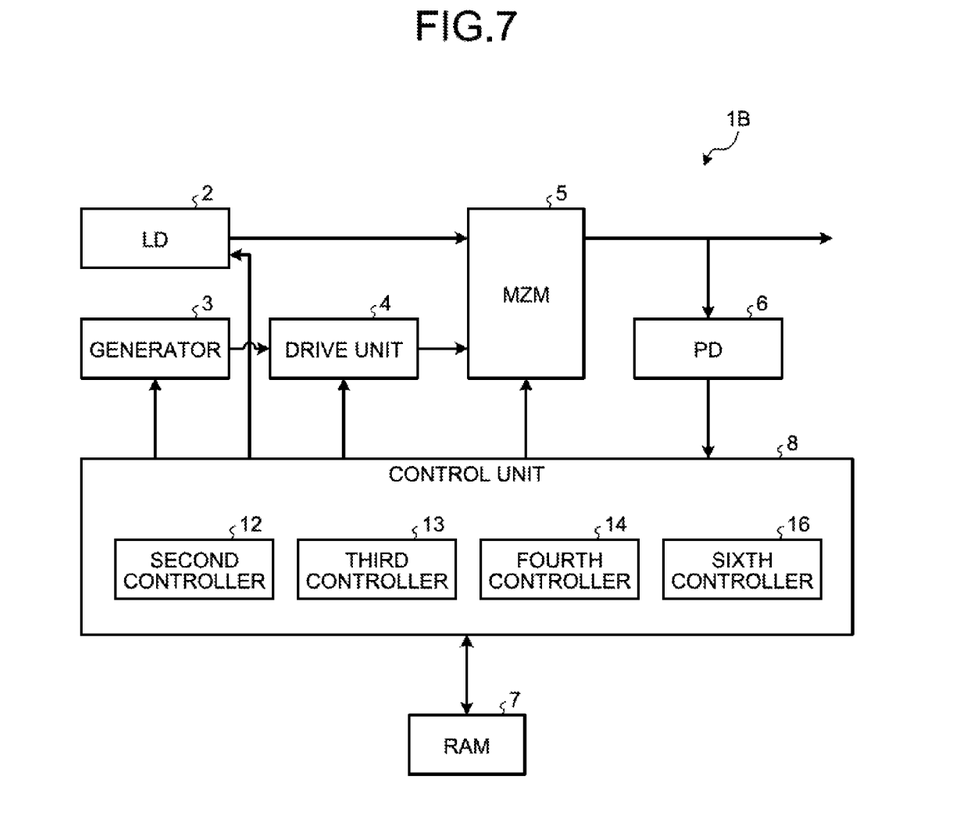
FIG. 7 is an explanatory diagram illustrating one example of an optical transmission device according to a third embodiment.

FIG. 7 is an explanatory diagram illustrating one example of an optical transmission device 1B according to the third embodiment. Herein, components that are the same as those of the optical transmission device 1 illustrated in FIG. 1 are designated by the same numerals, and duplicate description of these components and operation thereof is omitted. The optical transmission device 1B illustrated in FIG. 7 is different from the optical transmission device 1 illustrated in FIG. 1 in that a sixth controller 16 is provided instead of the first controller 11. The sixth controller 16 determines whether a free band in which the modulated optical signal optically modulated with the QPSK signal can be arranged has been detected at the start-up timing. When a free band in which the modulated optical signal optically modulated with the QPSK signal can be arranged has been detected, the sixth controller 16 controls the LD2 so as to output an optical signal having an optical wavelength fitting into the free band, and also controls the generator 3 so as to output the QPSK signal.

The second controller 12 starts the ABC using the modulated optical signal optically modulated with the QPSK signal, acquires a bias value when each bias converges to an optimum point in the ABC, which is an optimum value, and then stops the ABC. The second controller 12 stores the acquired optimum value in the RAM 7.

After the ABC using the modulated optical signal optically modulated with the QPSK signal is stopped, the third controller 13 changes the optical wavelength of the LD2 to λ2, and controls the generator 3 so as to output the N-QPSK signal. The fourth controller 14 sets, as an initial value for the ABC, an optimum value stored in the RAM 7 that is an optimum value obtained in the ABC using the modulated optical signal optically modulated with the QPSK signal, and restarts the ABC using the modulated optical signal optically modulated with the N-QPSK signal. Consequently, the optical transmission device 1B restarts the ABC using the modulated optical signal optically modulated with the N-QPSK signal, and thus can optimize the bias value of the MZM 5 when outputting the modulated optical signal optically modulated with the N-QPSK signal.

Figure 8:
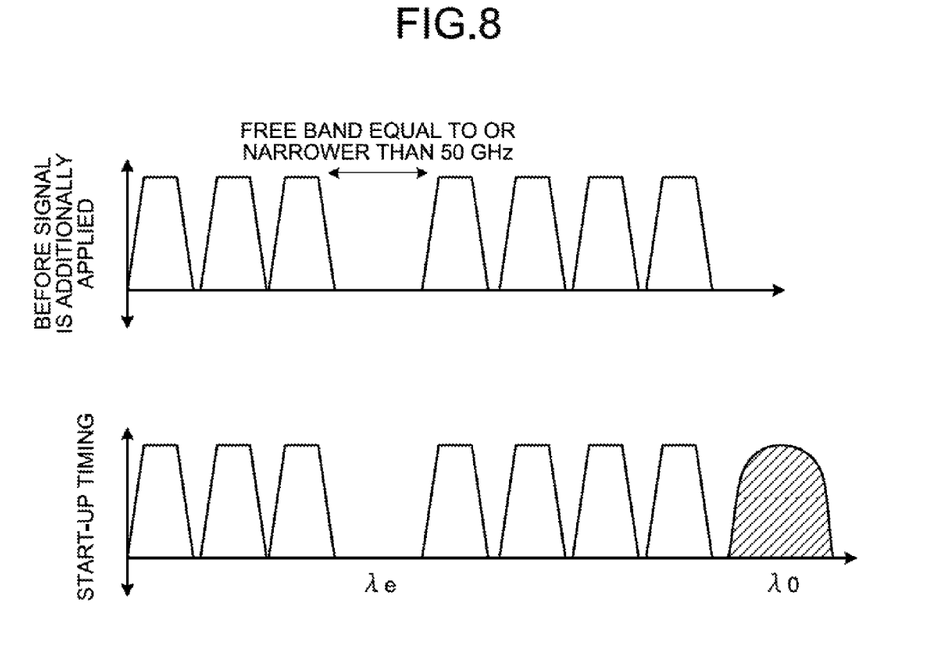
FIG. 8 is an explanatory diagram illustrating one example of processing when a modulated optical signal of the optical transmission device according to the third embodiment is used to perform ABC in a free band.

The following describes operation of the optical transmission device 1B according to the third embodiment. FIG. 8 is an explanatory diagram of one example of processing when a modulated optical signal of the optical transmission device 1B according to the third embodiment is used to perform the ABC in a free band. It is assumed that, in the operation band of a network illustrated in FIG. 8, for example, a modulated optical signal is arranged at frequency intervals of 50 GHz, and a free band the bandwidth of which is narrower than 50 GHz exists. It is also assumed that the optical transmission device 1B additionally arranges a modulated optical signal optically modulated with the N-QPSK signal into the free band having a bandwidth narrower than 50 GHz. In this case, because the bandwidth of the modulated optical signal optically modulated with the QPSK signal exceeds that of the free band, the sixth controller 16 searches a free band at the start-up timing. The sixth controller 16 controls the LD2 so as to output an optical signal having an optical wavelength λ1 fitting into the free band. The sixth controller 16 then starts the ABC using the modulated optical signal optically modulated with the QPSK signal. Consequently, in a free band at an end of the operation band, the ABC using the modulated optical signal optically modulated with the QPSK signal can be performed, whereby crosstalk between adjacent signals due to the modulated optical signal can be prevented.

Figure 9:
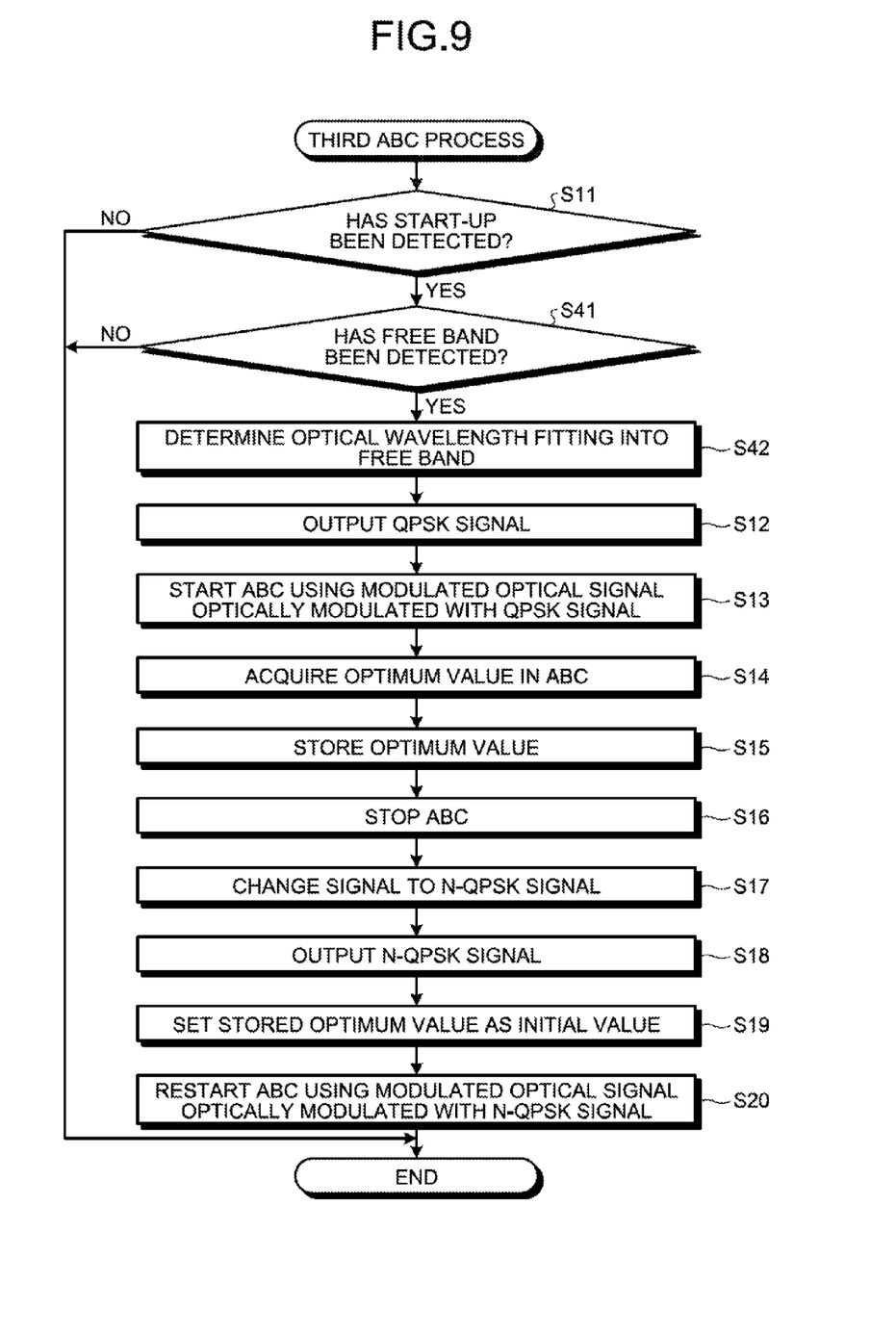
FIG. 9 is a flowchart illustrating one example of processing operation of the control unit in the optical transmission device related to a third ABC process.

FIG. 9 is a flowchart illustrating one example of processing operation of the control unit 8 in the optical transmission device 1B related to a third ABC process. The third ABC process includes processes of detecting a free band in the operation band at the start-up timing, acquiring an optimum value in the ABC using the modulated optical signal optically modulated with the QPSK signal in this free band, setting the optimum value as the initial value for the ABC, and restarting the ABC using the modulated optical signal optically modulated with the N-QPSK signal.

In FIG. 9, the sixth controller 16 in the control unit 8 determines whether the start-up timing of the optical transmission device 1B has been detected (step S11). If the start-up timing has been detected (Yes at step S11), the sixth controller 16 determines whether a free band has been detected in the operation band (step S41).

If a free band has been detected in the operation band (Yes at step S41), the sixth controller 16 controls the LD2 so as to output an optical signal having an optical wavelength fitting into the free band (step S42). After controlling the LD2 so as to output an optical signal having an optical wavelength fitting into the free band, the sixth controller 16 proceeds to step S12 so as to output the QPSK signal. If a free band has not been detected (No at step S41), the sixth controller 16 ends the processing operation illustrated in FIG. 9.

When having detected a free band in the operation band at the start-up timing, the control unit 8 that performs the third ABC process sets an optical signal having an optical wavelength fitting into the free band, and further starts the ABC using the modulated optical signal optically modulated with the QPSK signal. Furthermore, the control unit 8 acquires the optimum value obtained in the ABC, and stops the ABC. Furthermore, the control unit 8 sets the acquired optimum value as the initial value for the ABC, and restarts the ABC using the modulated optical signal optically modulated with the N-QPSK signal. Consequently, the optimum value obtained in the ABC using the modulated optical signal of the QPSK signal is used when the ABC using the modulated optical signal optically modulated with the N-QPSK signal, and thus the processing load needed to optimize the bias of the MZM 5 when the modulated optical signal optically modulated with the N-QPSK signal is output can be reduced.

When having detected a free band in the operation band at the start-up timing, the optical transmission device 1B according to the third embodiment sets an optical signal having an optical wavelength fitting into the free band, and further starts the ABC using the modulated optical signal optically modulated with the QPSK signal. Furthermore, the optical transmission device 1B acquires the optimum value obtained in the ABC, and stops the ABC. Furthermore, the optical transmission device 1B sets the acquired optimum value as the initial value for the ABC, and restarts the ABC using the modulated optical signal optically modulated with the N-QPSK signal. Consequently, the processing load needed to optimize the bias of the MZM 5 can be reduced.

In the embodiments described above, cases have been exemplified in which the optimum value of the MZM 5 is acquired by performing the ABC using the modulated optical signal optically modulated with the QPSK signal in an initial stage, and the acquired optimum value is set as the initial value to perform the ABC using the modulated optical signal optically modulated with the N-QPSK signal. However, the invention is not limited to the cases in which the ABC using the modulated optical signal optically modulated with the N-QPSK signal is performed, and can be applied also to cases in which the ABC using the modulated optical signal optically modulated with 32-QAM, 16-QAM, or 8-QAM.

Individual constituent elements of each of the components illustrated in the drawings do not have to be physically configured as illustrated therein. In other words, the specific embodiments of distribution and/or integration of each component are not limited to those illustrated in the drawings, and all or part of each component may be functionally or physically distributed or integrated in any units, depending on various loads or use conditions, for example.

Furthermore, all or any part of various processing functions performed in each device may be performed on a central processing unit (CPU) (or a microcomputer such as a micro processing unit (MPU) or a micro controller unit (MCU)). Needless to say, all or any part of the various processing functions may be performed on a program analyzed and executed by a CPU (or a microcomputer such as an MPU or an MCU) or on hardware based on wired logic.

In one aspect, false convergence of biases can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
a light emitter that emits an optical signal;
a generator that generates a driving signal;
an optical modulator that optically modulates the optical signal with the driving signal to output a modulated optical signal; and a processor configured to:
control a bias of the optical modulator, using the modulated optical signal, so as to cause the bias to converge to an optimum point;
control the generator so as to output the driving signal having an amplitude equal to or larger than a predetermined amplitude value at start-up timing;
start control of the bias using the modulated optical signal optically modulated with the driving signal having the amplitude equal to or larger than the predetermined amplitude value;
acquire an optimum value that is a bias value when the bias converges to the optimum point;
stop the control of the bias;
control the generator so as to output the driving signal having an amplitude smaller than the predetermined amplitude value after stopping the control of the bias;
set the acquired optimum value as an initial value; and
restart the control of the bias using the modulated optical signal optically modulated with the driving signal having the amplitude smaller than the predetermined amplitude value.

2. The optical transmission device according to claim 1, wherein the processor is further configured to control the generator so as to reduce a standard baud rate of the driving signal having the amplitude equal to or larger than the predetermined amplitude value to output the driving signal having the reduced baud rate at the start-up timing.

3. The optical transmission device according to claim 1, wherein the processor is further configured to:
control the generator so as to output a QPSK signal as the driving signal having the amplitude equal to or larger than the predetermined amplitude value at the start-up timing;
start control of the bias using the modulated optical signal optically modulated with the QPSK signal;
acquire an optimum value that is a bias value when the bias converges to an optimum point;
stop the control of the bias;
control the generator so as to output an N-QPSK signal as the driving signal having the amplitude smaller than the predetermined amplitude value after the control of the bias is stopped;
set the acquired optimum value as an initial value; and
restart the control of the bias using the modulated optical signal optically modulated with the N-QPSK signal.

4. The optical transmission device according to claim 1, wherein the processor is further configured to:
control the generator so as to output a QPSK signal as the driving signal having the amplitude equal to or larger than the predetermined amplitude value at the start-up timing;
start control of the bias using the modulated optical signal optically modulated with the QPSK signal;
acquire an optimum value that is a bias value when the bias converges to an optimum point;
stop the control of the bias;
control the generator so as to output a QAM signal of 8-QAM or higher-order QAM as the driving signal having the amplitude smaller than the predetermined amplitude value after the control of the bias is stopped;
set the acquired optimum value as an initial value; and
restart the control of the bias using the modulated optical signal optically modulated with the QAM signal.

5. An optical modulator comprising:
an optical modulator that optically modulates an optical signal with a driving signal to output a modulated optical signal; and a processor configure to:
control a bias of the optical modulator, using the modulated optical signal, so as to cause the bias to converge to an optimum point;
start control of the bias using the modulated optical signal optically modulated with the driving signal having an amplitude equal to or larger than a predetermined amplitude value at start-up timing;
acquire an optimum value that is a bias value when the bias converges to the optimum point;
stop the control of the bias;
set, after the control of the bias is stopped, the acquired optimum value as an initial value; and
restart the control of the bias using the modulated optical signal optically modulated with the driving signal having an amplitude smaller than the predetermined amplitude value.

6. A bias control method for an optical transmission device including an optical modulator that optically modulates an optical signal with a driving signal to output a modulated optical signal and a processor, the bias control method comprising:
Controlling, by the processor, a bias of the optical modulator, using the modulated optical signal, so as to cause the bias to converge to an optimum point
starting, by the processor, control of the bias using the modulated optical signal optically modulated with the driving signal having an amplitude equal to or larger than a predetermined amplitude value at start-up timing;
acquiring, by the processor, an optimum value that is a bias value when the bias converges to the optimum point;
stopping, by the processor, the control of the bias;
setting, by the processor, the optimum value as an initial value after stopping the control of the bias; and
restarting, by the processor, the control of the bias using the modulated optical signal optically modulated with the driving signal having an amplitude smaller than the predetermined amplitude value.

* * * * *